United States Patent [19]

Kawai

[11] Patent Number: 4,590,128

[45] Date of Patent: May 20, 1986

[54] THIN FILM EL ELEMENT

[75] Inventor: Hisao Kawai, Yamanashi, Japan

[73] Assignee: Hoya Corporation, Tokyo, Japan

[21] Appl. No.: 704,380

[22] Filed: Feb. 22, 1985

[30] Foreign Application Priority Data

Feb. 24, 1984 [JP] Japan .................................. 59-34017

[51] Int. Cl.[4] .......................... B32B 9/04; B32B 17/06

[52] U.S. Cl. .................................. 428/411.1; 313/509; 313/512; 428/426; 428/432; 428/457; 428/917

[58] Field of Search ...................... 428/913, 411.1, 917, 428/426, 457, 432; 427/165, 164; 313/509, 512

[56] References Cited

U.S. PATENT DOCUMENTS 4,140,937 2/1979 Vecht et al. ........................ 313/509
4,213,074 7/1980 Kawaguchi et al. ........... 313/512 X

FOREIGN PATENT DOCUMENTS 2039146 7/1980 United Kingdom ................ 428/913

OTHER PUBLICATIONS

*Nikkei Electronics*, "Structure and Characteristics of High-Brightness, Long-Life Thin EL Panel", Nov. 18, 1974, pp. 84-104.

U.K. Patent Application GB2039146A.

*Primary Examiner*—Thomas J. Herbert

*Attorney, Agent, or Firm*—Blakely, Sokoloff, Taylor & Zafman

[57] ABSTRACT

An electroluminescence element has a luminescence layer sandwiched between a transparent electrode and a back electrode so as to generate luminescence upon an application of an electric field between the transparent and back electrodes, wherein a light reflector is arranged behind the back electrode, and a light absorber is arranged at a side of a light extraction side of the electroluminescence element.

11 Claims, 5 Drawing Figures

THIN FILM EL ELEMENT

BACKGROUND OF THE INVENTION

The present invention relates to a thin film EL (electroluminescence) element with high contrast and good image quality.

Conventional thin film EL elements which have structures shown in FIGS. 1A and 1B are known.

The conventional thin film EL element shown in FIG. 1A is shown in FIG. 1 of "Structure and Characteristics of High-Brightness, Long-Life Thin Film EL Panel", pp. 84–104, NIKKEI ELECTRONICS, Nov. 18, 1974. in FIG. 1A, a transparent electrode 2 made of $In_2O_3$, $SnO_2$ or the like and a first insulating layer 3 made of $Y_2O_3$, $TiO_2$ or the like are sequentially formed by sputtering or electron beam deposition on a glass substrate 1. ZnS:Mn is deposited by electron beam deposition on the first insulating layer 3 using sintered pellets to constitute a luminescence layer 4. The amount of Mn added to the ZnS material varies in accordance with application purposes and normally falls within the range between 0.1 wt % and 2.0 wt %. A second insulating layer 5 of the same material as the first insulating layer 3 is deposited on the luminescence layer 4. A back electrode 6 made of Al or the like is deposited on the second insulating layer 5. When an electric field is applied between the transparent electrode 2 and the back electrode 6, this thin film EL element emits yellowish orange light.

Although this thin film EL element having the structure mentioned above has sufficient luminescence characteristics and long life in practical applications, a reflection coefficient between the second insulating layer 5 and the back electrode 6 is large, and incident ambient light is, therefore, reflected by 50% or more. When this EL element is used under high ambient illumination conditions, contrast ratio is decreased, resulting in inconvenience. In order to eliminate the above drawback, another conventional EL element is proposed, as shown in FIG. 1B.

The conventional thin film EL element shown in FIG. 1B is shown in FIG. 1 of U.K. Patent Application GB No. 2039146A. In FIG. 1B, a high-resistance light-absorbing layer 7 made of CdTe or the like is inserted between the luminescence layer 4 and the second insulating layer 5 of FIG. 1A so as to improve the contrast of the EL element. However, the luminescence characteristics of this EL element greatly differ from those of the EL element of FIG. 1A. Although the threshold voltage of light emission is lowered, the brightness slowly increases against voltage increase, resulting in a decrease in brightness. Moreover, when a high electric field is applied to the EL element shown in FIG. 1B, a dielectric breakdown often occurs.

SUMMARY OF THE INVENTION

It is, therefore, a principal object of the present invention to provide a thin film EL element operating with high contrast ratio and good display quality.

In order to achieve the above object of the present invention, there is provided a thin film EL element wherein a light reflector is arranged behind the back electrode, and a light absorber is arranged at the light emitting side.

DETAILED DESCRIPTION OF THE PREFERRED EMBODIMENT

The present invention will be described in detail with reference to the accompanying drawings.

Figure 1A:
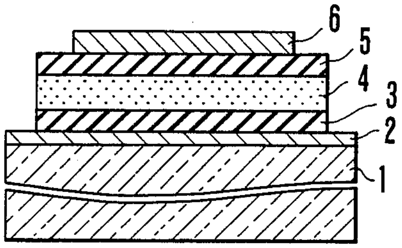
FIGS. 1A and 1B are sectional views of conventional thin film EL elements, respectively.
Figure 2:
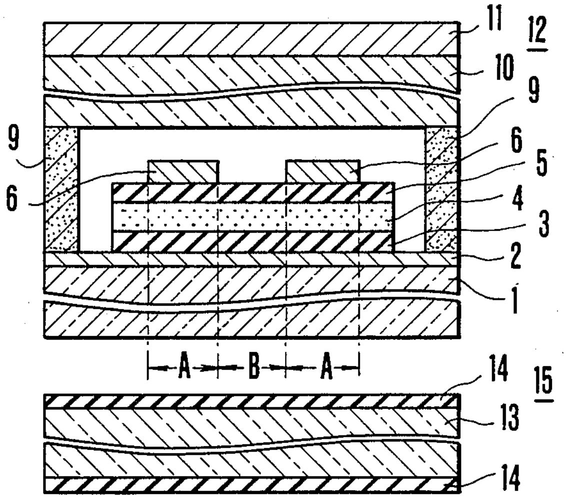
FIG. 2 is a sectional view of a thin film EL element according to an embodiment of the present invention.

FIG. 2 shows a thin film EL element according to an embodiment of the present invention. A structure including a transparent substrate 1 to a back electrode 6 is the same as that of the EL element shown in FIG. 1A. A thin transparent electrode 2 (with a film thickness of 2,000 Å) made of indium-tin oxide (to be referred to as an ITO hereinafter) is formed by DC magnetron sputtering on a quartz glassI substrate 1. This DC magnetron sputtering is performed under the conditions wherein a substrate temperature Ts is 200° C., a sputtering current density I is 1.5 $mA/cm^2$, an $O_2$ gas partial pressure $PO_2$ is $2\times10^{-4}$ Torr, and an Ar gas partial pressure PAr is $8\times10^{-4}$ Torr. In this case, sputtering is suitable for smoothening the surface of the transparent electrode 2. A first insulating layer 3 (with a film thickness of 3,000Å) made of $Y_2O_3$ is deposited by reactive evaporation on the transparent electrode 2. This reactive evaporation is performed under the conditions wherein the substrate temperature Ts is 300° C. and the $O_2$ gas partial pressure $PO_2$ is $1\times10^{-4}$ Torr By using ZnS:Mn sintered pellets obtained by adding 0.5 wt % of Mn to ZnS as a base material, a luminescence layer 4 (with a film thickness of 5,000 Å) is formed by vacuum evaporation (Ts=200° C.) on the first insulating layer 3. Subsequently, a second insulating layer 5 (with a film thickness of 3,000 Å) is formed on the luminescence layer 4 in the same manner as in the first insulating layer 3. A back electrode 6 (with a film thickness of 2,000 Å) of Al is deposited by vacuum evaporation (Ts=180° C.) on the second insulating layer 5. The transparent electrode 2 and the back electrode 6 are arranged in a matrix form. When an electric field is applied to the transparent electrode 2 and the back electrode 6 in the thin film EL element, yellowish orange light is emitted from a portion (pixel) of the luminescence layer 5 between the transparent electrode 2 and the back electrode 6 through the transparent substrate 1.

In the EL element having the structure including the transparent substrate 1 to the back electrode 6, average visible light reflectances at a region A with the back electrode 6 and a region B without the back electrode 6 are about 60% and 20%, respectively, when viewed from the side of the transparent substrate 1 so that the contrast ratio is low. As a result, the pattern of the back electrode 6 can be visually observed and it is difficult to observe the luminescent pixels due to the intensive reflection of incident ambient light, and the image quality is degraded.

According to this embodiment, a reflecting metal film 11 (with a thickness of 1,000 Å) of Cr is formed by sputtering or vacuum evaporation on the upper surface (or the lower surface so as to oppose the back electrode 6) of a sealing glass plate 10 made of soda lime glass to constitute a light reflector 12. The light reflector 12 is arranged behind the back electrode 6. The back electrode 6, second insulating layer 5, luminescence layer 4, first insulating layer 3 and transparent electrode 2 constitute a light emitting portion and are put in an envelope which prevents an intrusion of moisture therein since the EL element is very sensitive to water vapor. The envelope is constituted by the glass plate 10, the glass substrate 1, the transparent electrode 2 on the glass substrate 1 and a photocuring adhesive 9 which is put between the glass plate 10 and the glass substrate 1 and the transparent electrode 2 so as to surround the light emitting portion. When viewed at the side of the transparent substrate 1, the average visible light reflectance for the region A is about 60% since the visible light is reflected by the back electrode 6 and the average visible light reflectance for the region B is also about 60% since the visible light is reflected by the metal layer 11. Therefore, the average visible light reflectances at the regions A and B are substantially equal to each other. As a result, the contrast of the pattern of the back electrode 6 is greatly decreased, so it is difficult for the user to visually observe the electrode pattern from the side of the transparent substrate 1.

Figure 3:
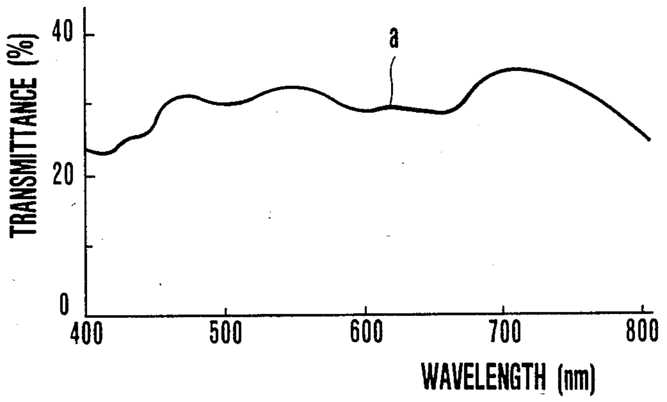
FIG. 3 is a graph showing the transmittance of a light absorber as a function of the wavelength of light in the thin film EL of FIG. 2.

The light absorber 15 is arranged at the light emitting side of the EL element. The light absorber 15 is constituted by a glass plate 13 and dielectric layers 14. The glass plate 13 comprises a borosilicate (alkali metal oxide) glass, iron and cobalt elements, and on the upper and lower surfaces of the glass plate 13 the dielectric layers 14 (for example, $MgF_2$ layers with an optical thickness of $\lambda/4$ where $\lambda$ is 580 nm) of antireflecting are coated so as to eliminate the reflection of incident ambient light and also effectively extract the EL emission. Visible light transmittance of the light absorber 15 is about 24% to 34%, as indicated by a spectral transmittance characteristic curve a of FIG. 3 and has variations falling within the range of $\pm 5\%$ with respect to the average transmittance of 29%. A preferable range of the visible light transmittances is 10% to 70%. A detailed description of light reflection at the upper and lower surfaces of the light absorber 15 is omitted by way of simplicity. Under this condition, if the transmittance thereof is given as t, the reflectance at the region A is given as r, and the luminescent brightness of the EL element is given as b when the light absorber 15 is not present, the luminescent brightness B and reflectance R of the EL element with the light absorber 15 are given as follows: $B = tb$ and $R = t^2 r$. According to the decrease of transmittance t, the reflectance R is decreased, while the luminescent brightness B is also decreased. Therefore, the transmittance t should be optimized as follows. When the practical range of the transmittances t is considered, an upper limit tmax thereof is $\sqrt{R/r} = 70\%$ since the reflectance R is preferably decreased to $\frac{1}{2}$ of the reflectance r, and a lower limit tmin is given 10% as a ratio of the minimum luminescent brightness Bmin (10 cd/$m^2$ in this embodiment) to the luminescent brightness b (100 cd/$m^2$ in this embodiment). The wavelength dispersion of transmittance of the light absorber 15, however, is preferably less than $\pm 10\%$ so as to obtain substantially uniform contrast.

Figure 4:
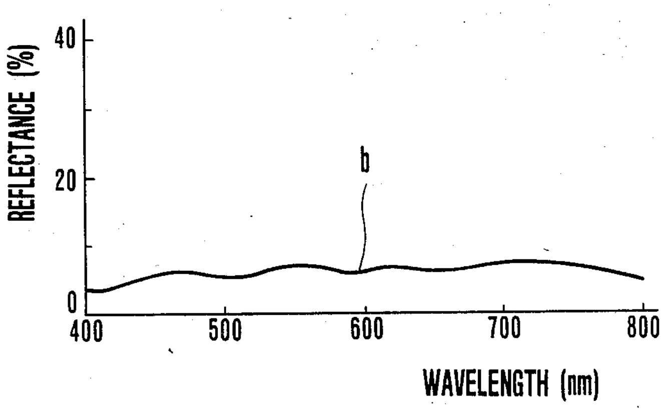
FIG. 4 is a graph showing the reflectance of the EL element of FIG. 2 as a function of the wavelength of light.

The light absorber 15 of this embodiment suppresses visible light reflectance to 4 to 7%, as indicated by the curve b of FIG. 4. As a result, the contrast of the EL element can be kept high.

As the reflectance at the region B is substantially equal to that at the region A with the use of the light reflector 12, unlike the conventional EL element, the pattern of the back electrodes cannot be seen. As a result, the display quality is quite improved.

The present invention is not limited to the particular embodiment described above. Various changes and modifications may be made within the spirit and scope of the invention. For example, a multicomponent glass material (e.g., alumino-borosilicate) or a transmission glass material (e.g., quartz glass) may be used as the material of the glass plate 10 for the light reflector 12. The metal film 11 may comprise Ta, Ni, NiCr, Mo or Al. Furthermore, the light reflector 12 can comprise a metal plate instead of the glass plate 10. The dielectric layer 14 of the light absorber 15 may comprise a single $SiO_2$ layer, or a multilayer selected from $MgF_2$, $SiO_2$, $TiO_2$ and $HfO_2$ layers. Furthermore, a thin light-absorbing film made of PbTe, CdTe or C can be formed on one of or both the upper and lower surfaces of the glass plate 13. The glass plate 13 may also serve as the transparent substrate 1. In this case, referring to FIG. 2, the light absorber 15 is used in place of the transparent substrate 1. When a dielectric layer or a thin light-absorbing film is formed on the surface of the glass plate 13, the glass plate 13 preferably has a visible light transmittance range of 10 to 70% and a wavelength dispersion of transmittance of $\pm 10\%$. The glass type of light absorber is not limited to a particular type. Nickel and cobalt may be used as additives to borosilicate $R_2O$ glass. Also the light absorber is not limited to a glass plate. Various kinds of plastics are available as far as they have the optical characteristics mentioned above.

Figure 1B:
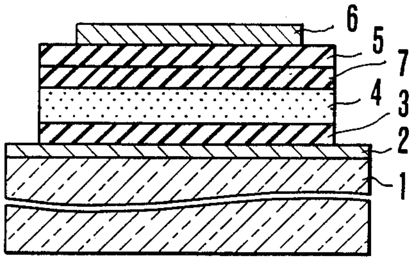

Further modifications may also be made. The stacking structure from the transparent electrode 2 to the back electrode 6 may be arbitrarily changed. The basic structure of FIG. 1 may be of a MIS type wherein the transparent electrode 2 contacts the luminescence layer 4 without the insulating layer 3. In addition, the materials of the components of the EL element can be changed in the following manner. The transparent substrate can comprise a multicomponent glass substrate (e.g., a soda lime glass or alumino-borosilicate glass substrate) in place of the quartz glass substrate. Instead of ITO, the transparent electrode may comprise $In_2O_3$ or $In_2O_3$ with an additive of W, or $SnO_2$ with Sb or F. Instead of $Y_2O_3$, the insulating layers may comprise $Ta_2O5$, $TiO_2$, $Al_2O_3$, $Si_3N_4$, $SiO_2$, or the like. Instead of ZnS as the base material, the luminescent layer may comprise ZnSe or a mixture of ZnS and ZnSe. Activators for such a base material may be selected from Mn, Cu, Al, a rare earth metal, and a halogen. For example, a luminescent material ZnS:Cu,Al provides yellowish green luminescence, and Zn(S Se):Cu,Br provides green luminescence. The activator Sm for the base material ZnS provides red luminescence; Tb, green luminescence; Tm, blue luminescence. Any luminescent layer may be divided into first and second luminescence layers through a transparent dielectric layer ($Y_2O_3$, $Ta_2O5$, $TiO_2$, $Al_2O_3$, $Si_3N_4$, $SiO_2$ or the like). In this case, the first and second luminescence layers comprise a single luminescence material or different luminescence materials. In the latter case, for example, when a thin ZnS film doped with $TbF_3$ is used to form the first luminescence layer, the first luminescence layer provides green luminescence; and when a thin ZnS film doped with $SmF_3$ is used to form the second luminescence layer, the second luminescence layer provides red luminescence. As a result, a thin EL element provides luminescence of an intermediate color between green and red. The back electrode comprises a metal such as Ta, Mo, Fe, Ni or NiCr in place of Al.

The thin film EL element of the present invention provides good luminescent brightness characteristics, high image quality and high contrast.

What is claimed is:

1. An electroluminescense element having a luminescence layer sandwiched between tranparent electrodes and back electrodes formed on a transparent substrate respectively in the form of a matrix, so as to generate luminescence upon the application of an electric field between said transparent electrodes and back electrodes, wherein a light reflector for reflecting light passing between adjacent back electrodes is arranged behind said back electrodes, and a light absorber for absorbing visible, reflected light of said electroluminiescence element is arranged on the light extracting side of said transparent electrodes.

2. An element according to claim 1 wherein a visible light reflectance of said light reflector is substantially the same as that of a region with said back electrodes when viewed from the side of said transparent electrodes, a transmittance of said light absorber falls within a range between 10% and 70%, and a wavelength dispersion of transmittance of the visible light falls within a range of ±10%.

3. An element according to claim 2, wherein said light reflector comprises a metal plate.

4. An element according to claim 2, wherein said light absorber comprises a plastic material.

5. An element according to claim 2, wherein said light absorber comprises a glass substrate and at least one dielectric layer formed on at least one major surface of said glass substrate.

6. An element according to claim 5, wherein said glass substrate comprises an alkali metal oxide with iron and cobalt, and said at least one dielectric layer is constituted by either a single layer consisting of one of magnesium fluoride and silicon dioxide or at least two layers consisting of at least two materials selected from the group consisting of magnesium fluoride, silicon dioxide, titanium dioxide and hafnium oxide.

7. An element according to claim 2, wherein said light absorber comprises a glass substrate and a thin light-absorbing film formed on at least one of two major surfaces of said glass substrate.

8. An element according to claim 7, wherein said glass substrate comprises an alkali metal oxide with iron and cobalt, and said thin light-absorbing film comprises at least one material selected from the group consisting of lead-tellurium, cadmium-tellurium and carbon.

9. An element according to claim 2, wherein said light reflector comprises a sealing plate disposed above said transparent substrate with an intervening adhesive means for a sealing purpose, and a metal film for reflection formed on at least one major surface of said sealing plate.

10. An element according to claim 9, wherein said reflecting metal film comprises a metal selected from the group consisting of chrome, tantalum, nickel, nickel-chrome, molybdenum and aluminum.

11. An element according to claim 1, wherein said sealing plate comprises a member selected from the group consisting of a multicomponent glass and a quartz glass.

* * * * *

UNITED STATES PATENT AND TRADEMARK OFFICE
CERTIFICATE OF CORRECTION

PATENT NO. : 4,590,128

DATED : May 20, 1986

INVENTOR(S) : Kawai

It is certified that error appears in the above-identified patent and that said Letters Patent is hereby corrected as shown below:

| COLUMN | LINE | |
|---|---|---|
| 6 | 30 | Please delete "Claim 1" and insert --Claim 9--. |

Signed and Sealed this

Second Day of December, 1986

*Attest:*

DONALD J. QUIGG

*Attesting Officer* *Commissioner of Patents and Trademarks*

UNITED STATES PATENT AND TRADEMARK OFFICE

CERTIFICATE OF CORRECTION

PATENT NO. : 4,590,128

DATED : May 20, 1986

INVENTOR(S) : Kawai

It is certified that error appears in the above-identified patent and that said Letters Patent is hereby corrected as shown below:

| COLUMN | LINE | DESCRIPTION |
|---|---|---|
| 2 | 25 | please delete "glassI" and insert --glass--. |
| 3 | 39 | please delete "a" and insert --a--. |
| 4 | 48 | please delete "$Ta_2 05$" and insert --$Ta_2 0_5$--. |
| 4 | 60 | please delete "$Ta_2 05$" and insert --$Ta_2 0_5$--. |

Signed and Sealed this

Seventeenth Day of March, 1987

*Attest:*

DONALD J. QUIGG

*Attesting Officer*

*Commissioner of Patents and Trademarks*